United States Patent
Huang

(10) Patent No.: US 8,404,961 B2
(45) Date of Patent: Mar. 26, 2013

(54) MOLDING DEVICE CAPABLE OF CONVERTING HEAT FROM MOLTEN MOLDING MATERIAL INTO ELECTRICITY

(75) Inventor: Chien-Feng Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 12/749,471

(22) Filed: Mar. 29, 2010

(65) Prior Publication Data

US 2010/0294324 A1    Nov. 25, 2010

(30) Foreign Application Priority Data

May 25, 2009  (CN) .......................... 2009 1 0302605

(51) Int. Cl.
*H01L 35/30* (2006.01)
*E04G 17/00* (2006.01)

(52) U.S. Cl. .................... 136/205; 249/211; 249/78

(58) Field of Classification Search .............. 136/205; 264/255, 219; 249/211, 78

See application file for complete search history.

(56) References Cited

U.S. PATENT DOCUMENTS

| | | | |
|---|---|---|---|
| 5,064,597 A | * | 11/1991 | Kim .............................. 264/219 |
| 5,228,923 A | * | 7/1993 | Hed .............................. 136/208 |
| 2005/0000726 A1 | * | 1/2005 | Kimata et al. ................ 174/256 |
| 2007/0096364 A1 | * | 5/2007 | Hahn et al. .................... 264/255 |

FOREIGN PATENT DOCUMENTS

| JP | 57089929 A | * | 6/1982 |
|---|---|---|---|
| JP | 2001-358372 | * | 12/2001 |

OTHER PUBLICATIONS

JP2001-358372, Morino, Machine Translation, Dec. 2001.*

* cited by examiner

*Primary Examiner* — Jonathan Johnson
*Assistant Examiner* — Devina Pillay
(74) *Attorney, Agent, or Firm* — Altis Law Group, Inc.

(57) ABSTRACT

A mold includes a first mold half, a second mold half opposite to the first mold half, and a thermoelectric generator. The thermoelectric generator includes a high temperature conductive portion, a semiconductor electricity-generating portion, and a low temperature conductive portion. The high temperature conductive portion is positioned in contact with the first mold half and configured to conduct heat from the first mold half to the semiconductor electricity-generating portion. The low temperature conductive portion is exposed to the air. The semiconductor electricity-generating portion is sandwiched between the high temperature conductive portion and the low temperature conductive portion, and positioned in contact with the high temperature conductive portion and the low temperature conductive portion; the semiconductor electricity-generating portion is configured for forming a voltage difference.

5 Claims, 6 Drawing Sheets

MOLDING DEVICE CAPABLE OF CONVERTING HEAT FROM MOLTEN MOLDING MATERIAL INTO ELECTRICITY

BACKGROUND

1. Technical Field

The present disclosure relates to molds and, particularly, to a molding device capable of converting heat from molten molding material into electricity.

2. Description of Related Art

Many molds employ some kind of internal heater to maintain proper working temperatures of molten molding material and molding faces. However, heat easily transfers from the mold material and faces to the outside, wasting energy.

Therefore, what is needed is a mold to overcome the shortcoming described above.

BRIEF DESCRIPTION OF THE DRAWINGS

The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
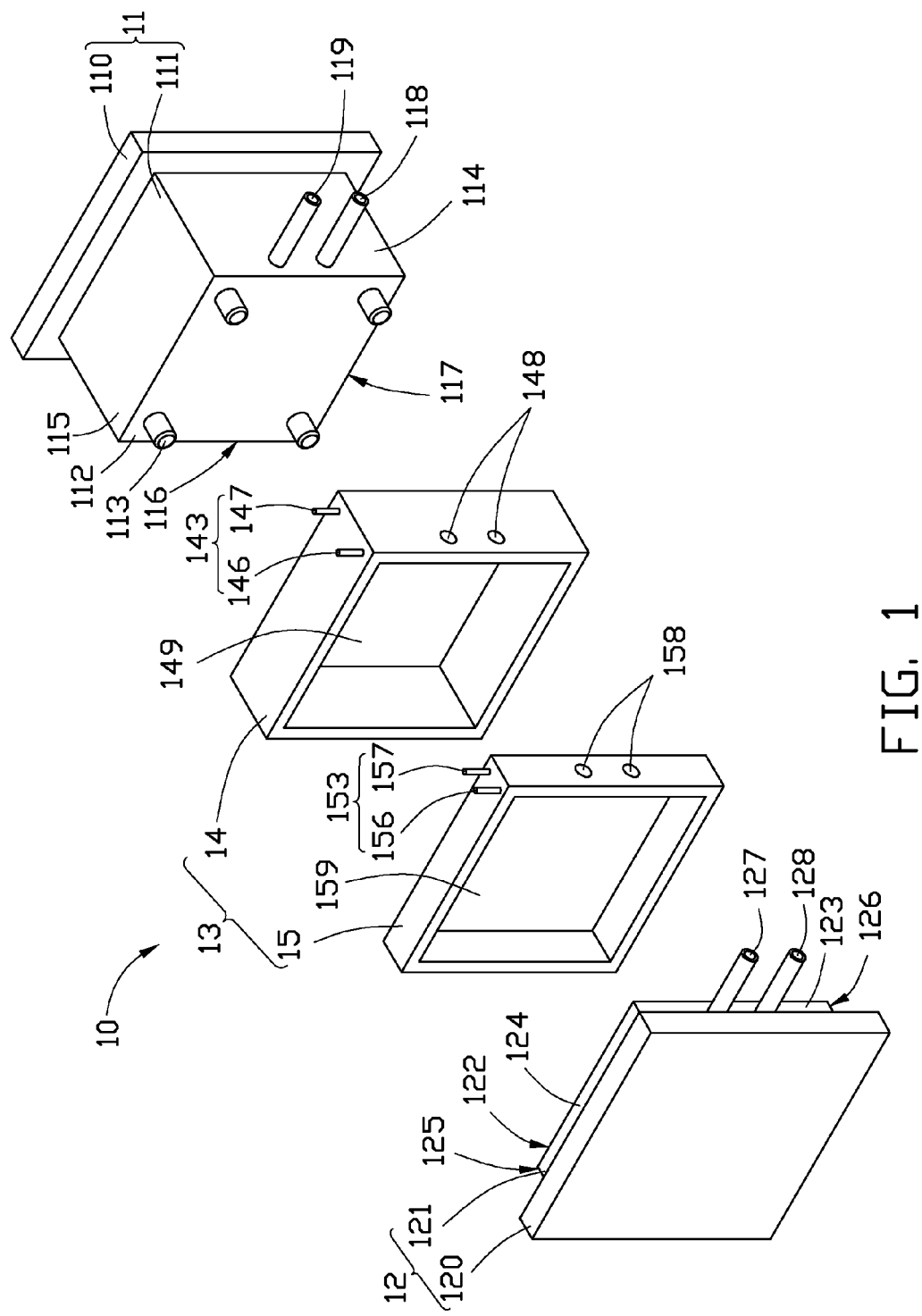
FIG. 1 is an exploded, isometric view of a mold in accordance with an exemplary embodiment.
Figure 2:
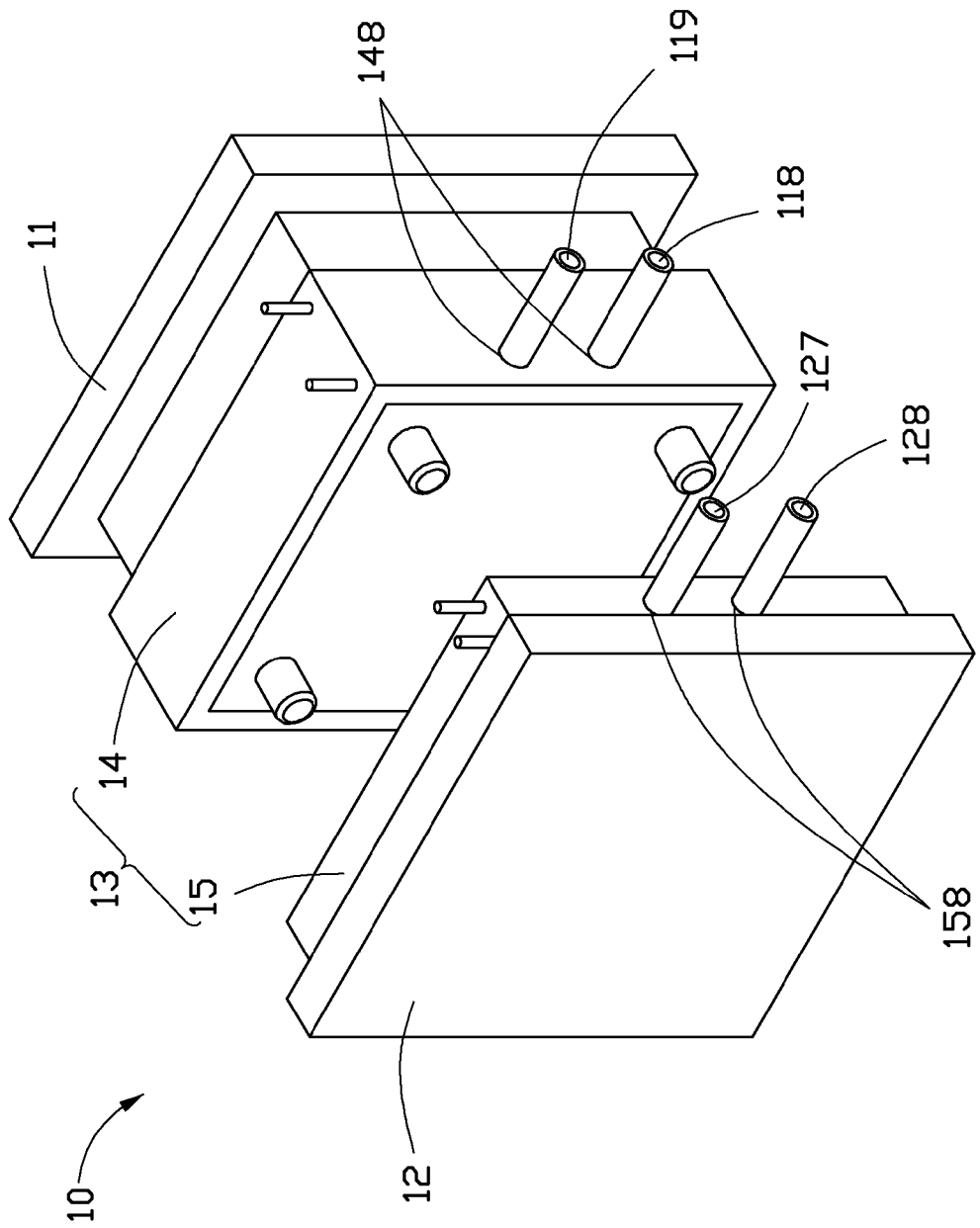
FIG. 2 is an assembled isometric view of the mold shown in FIG. 1.

Referring to FIGS. 1-2, a mold 10 is provided. The mold 10 includes a first mold half 11, a second mold half 12, and a thermoelectric generator 13.

The first mold half 11 includes a first mold base 110 and a first mold core 111 connected to the first mold base 110. A first molding face 112 is defined in the first mold core 111. At least two locating pins 113 protrude from the first molding face 112. In the embodiment, there are four locating pins 113. The first molding face 112 defines a cavity.

The first mold core 111 includes a first side face 114, a second side face 115, a third side face 116, and a fourth side face 117. The four side faces 114-117 extend from the first mold base 110 to the first molding face 112 and are perpendicular to the first molding face 112 and the first mold base 110. The first mold core 111 further includes at least one first inlet pipe 118 and at least one first outlet pipe 119, which are used to guide the molten plastic to flow into or flow out from the first mold core 111. The first mold core 111 can thus obtain heat from the molten plastic and thus stay at a working temperature. In the embodiment, there is one each of the first inlet pipe 118 and the first outlet pipe 119 and both are made of thermal insulating material and are fixed to the first side face 114.

The second mold half 12 includes a second mold base 120 and a second mold core 121 connected to the second mold base 120, wherein the second mold core 121 is closer to the first mold half 11 than the second mold base 120. The second mold core 121 includes a second molding face 122 corresponding to and facing the first molding face 112. The second molding face 122 defines at least two locating grooves. In the embodiment, there are four locating grooves formed to respectively receive the four locating pins 113. The second molding face 122 defines a cavity, which is adapted for cooperatively molding components with the cavity of the first molding face 112.

The second mold core 121 includes a first side surface 123, a second side surface 124, a third side surface 125, and a fourth side surface 126. The four side surfaces 123-126 extend from the second mold base 120 to the second molding face 122 and are perpendicular to the second molding face 122. At least one second inlet pipe 127 and one second outlet pipe 128 are connected to the second mold core 121. The second inlet pipe 127 and the second outlet pipe 128 are used to guide the molten plastic to flow into or flow out from the second mold core 121, the second mold core 121 can obtain heat from the molten plastic, and thus stay at a working temperature. In the embodiment, there is one each of the second inlet pipe 127 and the second outlet pipe 128 and both are made of thermal insulating material and are fixed to the first side face 123.

The thermoelectric generator 13 includes a first thermoelectric generator 14 and a second thermoelectric generator 15, which are connected in parallel.

Figure 3:
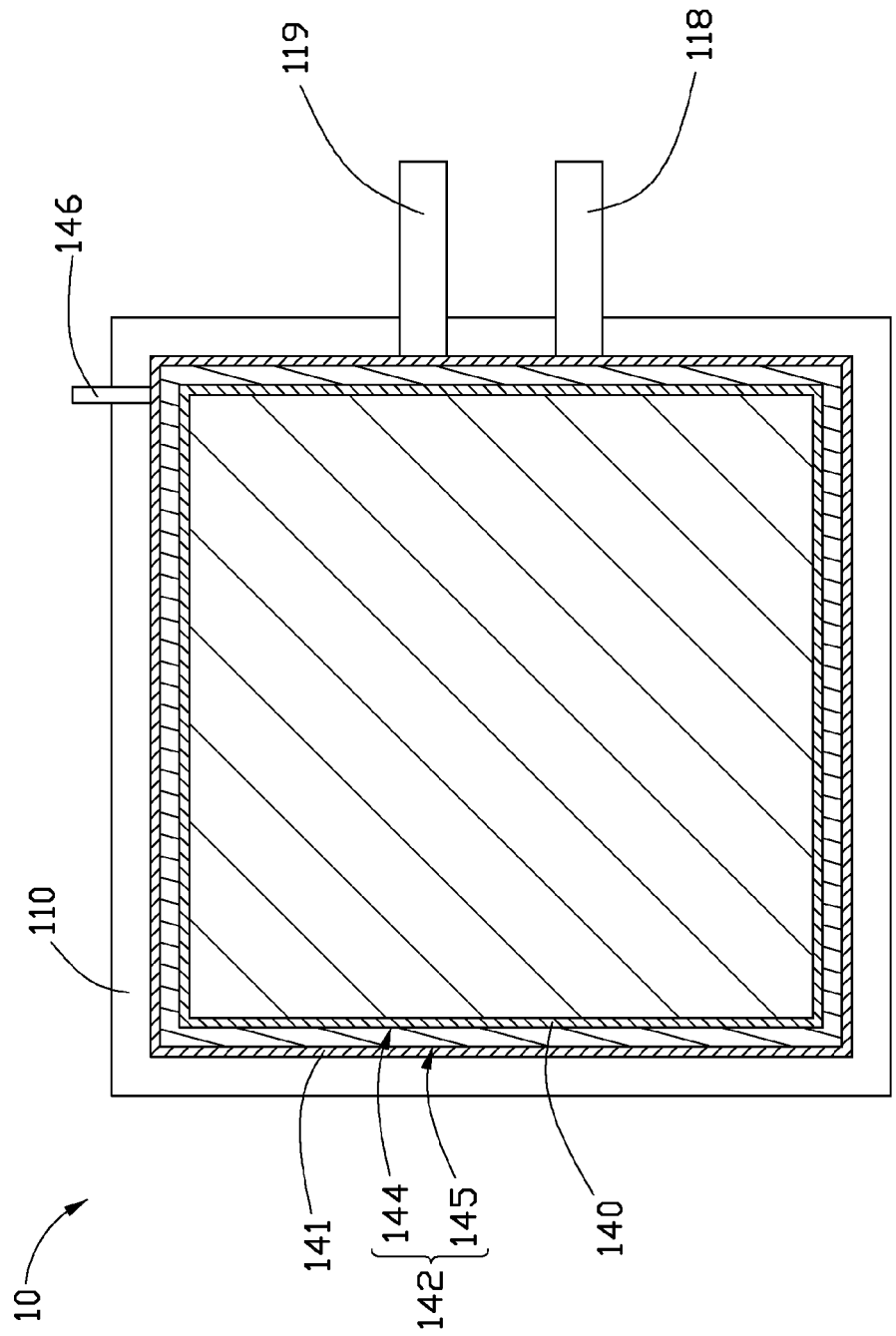
FIG. 3 is a cross-sectional view of a first mold half shown in FIG. 1.

Referring to FIG. 3, the first thermoelectric generator 14 is mounted to the first mold half 11 and configured to convert the heat emitted from the first mold half 11 into electricity. The first thermoelectric generator 14 includes a first high temperature conductive portion 140, a first low temperature conductive portion 141, a first semiconductor electricity-generating portion 142, and a first electrode portion 143. The first high temperature conductive portion 140 is positioned inside the low temperature conductive portion 141, and defines a receiving space 149. The receiving space 149 has a shape substantially identical to that of the first mold core 111, such that the first thermoelectric generator 14 can be attached to first mold half 11 by the mating of the receiving space 149 and the first mold core 111.

The first high temperature conductive portion 140 keeps tight contact with the surfaces 123, 124, 125, and 126 of the first mold core 111, such that the heat from the first mold core 111 can be collected. In the embodiment, the first high temperature conductive portion 140 is made of material with high heat conductivity, such as copper, aluminum etc.

The first low temperature conductive portion 141 is exposed to air. In the embodiment, a cooling fin is formed on the side of the first low temperature conductive portion 141.

Figure 4:
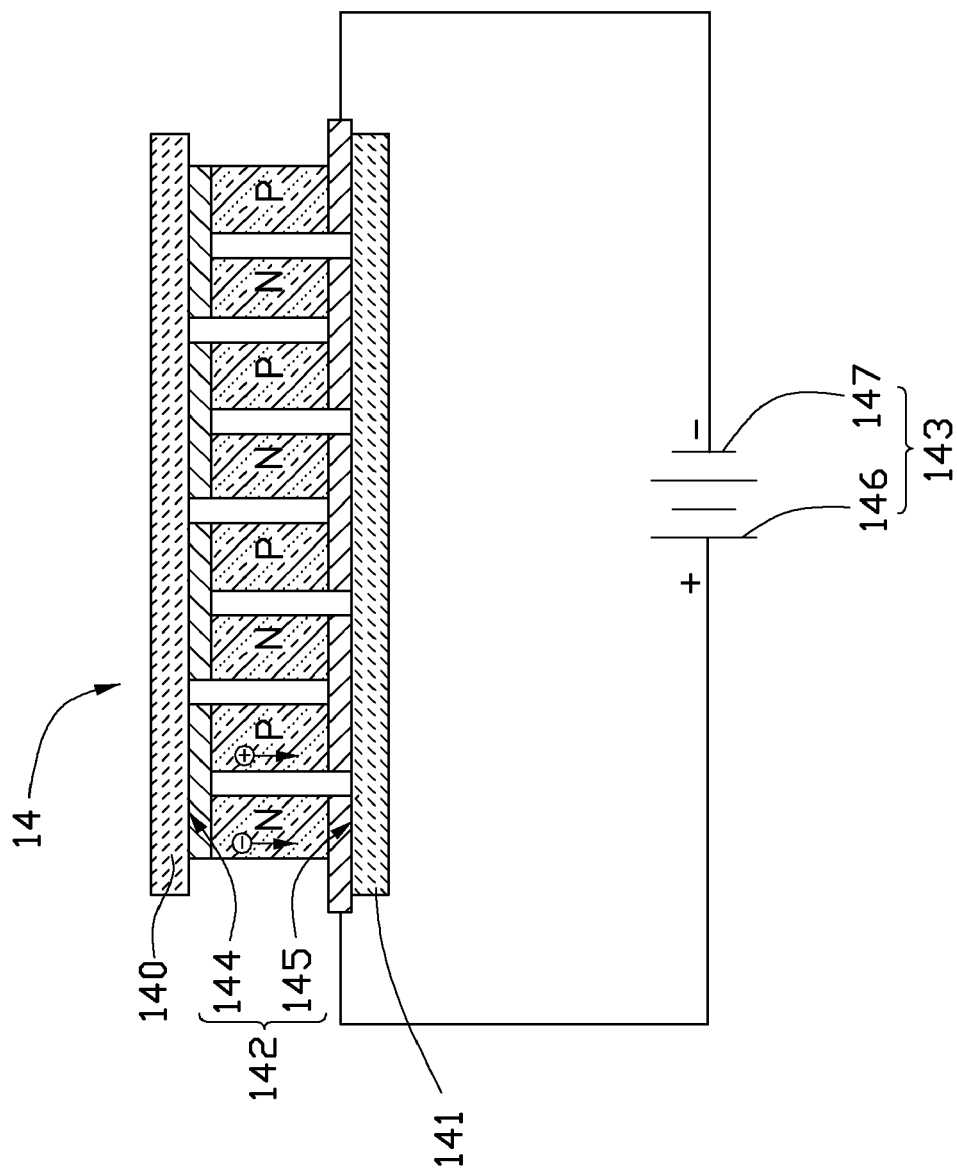
FIG. 4 is a schematic diagram of a first thermoelectric generator shown in FIG. 1.
Figure 5:
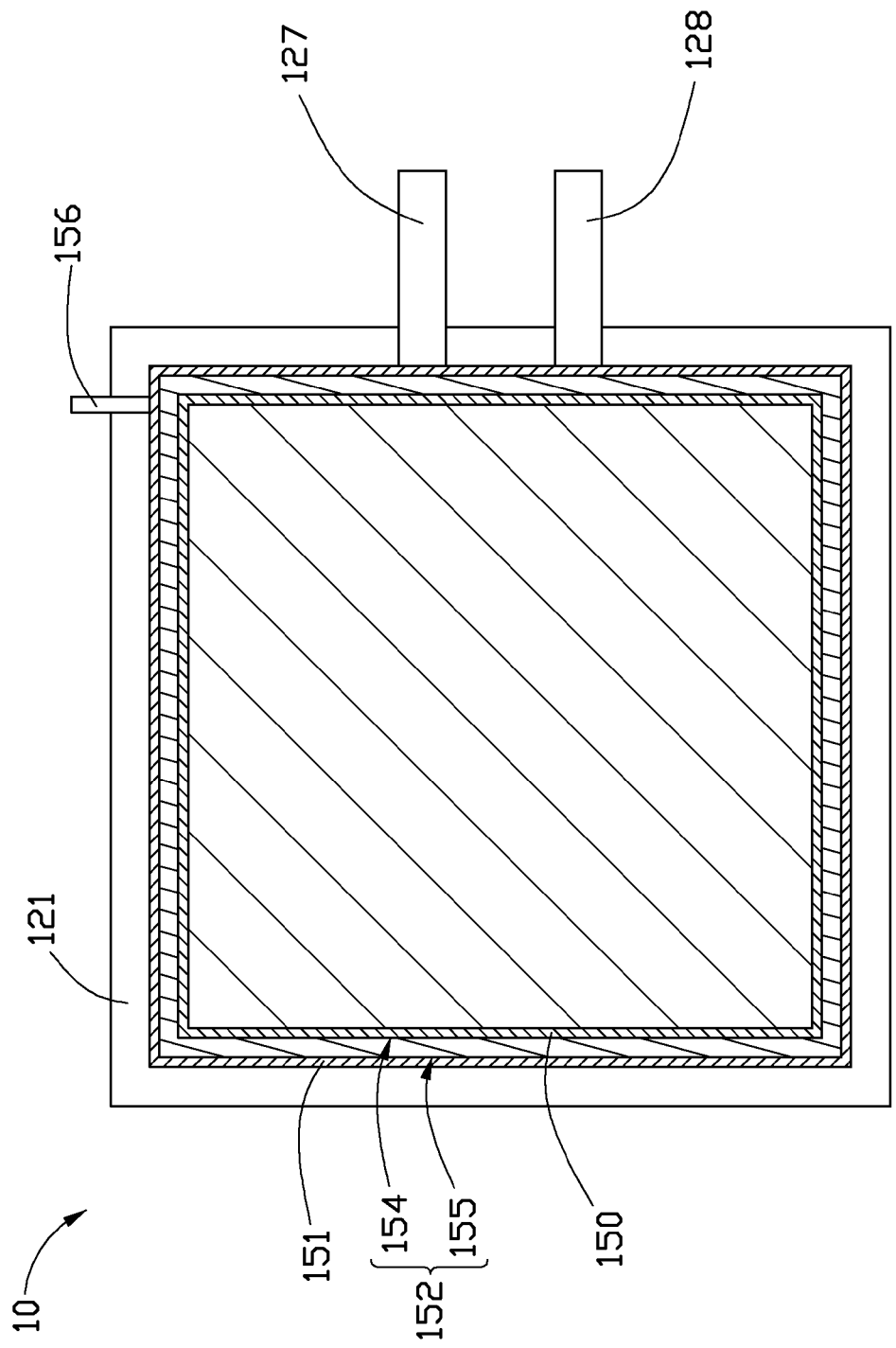
FIG. 5 is a cross-sectional view of a second mold half shown in FIG. 1.
Figure 6:
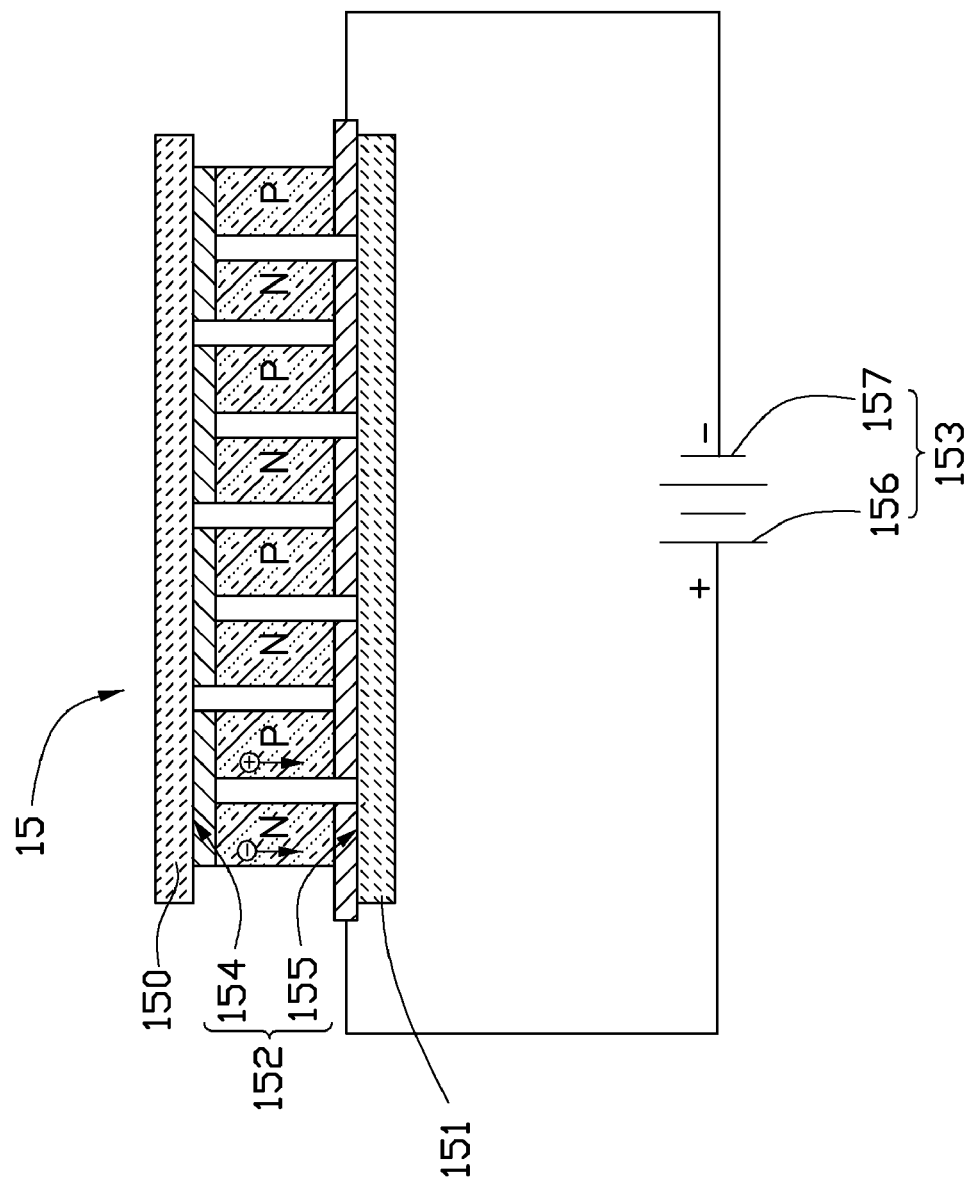
FIG. 6 is a schematic diagram of a second thermoelectric generator shown in
FIG. 1.

Referring to FIG. 4, the first semiconductor electricity-generating portion 142 includes a first hot surface 144 and a first cold surface 145. The first hot surface 144 stays in contact with the first high temperature conductive portion 140, while the cold surface 145 stays in contact with the low temperature conductive portion 141. The first semiconductor electricity-generating portion 142 includes semiconductor electricity-generating wafer that includes a plurality of semiconductor P-N junctions connected to each other in series.

Because a temperature difference exists between the contact surfaces 144 and 145, in the P-type semiconductor, the concentration of positive holes adjacent the first hot surface 144 is higher than near the first cold surface 145. In the N-type semiconductor, the concentration of the electrons adjacent the first hot surface 144 is higher than near the first cold surface 145. In the driving of the concentration gradient, the positive holes of the P-type semiconductor in the semiconductor P-N junction and the electron of the N-type semiconductor diffuse from the first contact surface 144 to the second first cold surface 145. The P-type semiconductor is connected in series with the N-type semiconductor, so there is a voltage difference in the semiconductor electricity-generating portion 142 adjacent the first cold surface 145.

The first electrode portion 143 is connected to an external circuit (not shown). The electrode 143 includes a first positive electrode 146 and a first negative electrode 147, which are both connected to the first semiconductor electricity-generating portion 142 adjacent the first cold surface 145, so that the first positive electrode 146 and the first negative electrode 147 can output the voltage formed via the semiconductor electricity-generating portion 142. In the embodiment, the first positive electrode 146 and the first negative electrode 147 are arranged on an outer surface of the first low temperature conductive portion 141.

The first thermoelectric generator 14 includes at least two first openings 148. The first openings 148 extend through the first high temperature conductive portion 140, the first semiconductor electricity-generating portion 142, and a first low temperature conductive portion 141. The first inlet pipe 118 and the first outlet pipe 119 can thus pass through the first low temperature conductive portion 141 and the first high temperature conductive portion 140. In the embodiment, there are two first openings 148.

The second thermoelectric generator 15 is mounted to the second mold half 12 and configured to convert the heat emitted from the second mold half 12 into electricity. In the embodiment, the structure of the second thermoelectric generator 15 is the same as that of the first thermoelectric generator 14. That is, the generator 15 includes a second high temperature conductive portion 150, a second low temperature conductive portion 151, a second semiconductor electricity-generating portion 152, and a second electrode portion 153. The second high temperature conductive portion 150 is positioned inside the low temperature conductive portion 151, and defines a receiving space 159. The receiving space 159 has a shape substantially identical to that of the second mold core 121, such that the second thermoelectric generator 15 can be attached to the second mold half 12 by the mating of the receiving space 159 and the first mold core 121.

The second high temperature conductive portion 150 keeps tight contact with the side surface 123, 124, 125, and 126 of the second mold core 121, such that the heat from the second mold core 121 can be collected. The second low temperature conductive portion 151 is exposed to the air. The second semiconductor electricity-generating portion 152 is sandwiched between the second high temperature conductive portion 150 and the second low temperature conductive portion 151. A second hot surface 154 and a second cold surface 155 are defined on the second semiconductor electricity-generating portion 152.

When a temperature difference between the second hot surface 154 and the second cold surface 155 exists, the second semiconductor electricity-generating portion 152 will generate a voltage difference and output the voltage via the second electrode portion 153. The second electrode portion 153 includes a second positive electrode 156 and a second negative electrode 157, which are both electrically connected to the second semiconductor electricity-generating portion 152. In the embodiment, the second positive electrode 156 and the second negative electrode 157 are arranged on an outer surface of the second low temperature conductive portion 151.

The second thermoelectric generator 15 further includes at least two second openings 158. The second opening 158 extends through the second high temperature conductive portion 150, the second semiconductor electricity-generating portion 152, and the second low temperature conductive portion 151, so that the second inlet pipe 156 and the second outlet pipe 157 pass through the second low temperature conductive portion 151 and the second high temperature conductive portion 150. In the embodiment, there are two second openings 158.

In this way, the present mold recycles heat, that would otherwise escape to the atmosphere, to maintain proper working temperatures and save money on energy costs.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A mold comprising:
    a first mold half comprising a first mold base and a first mold core connected to the first mold base, the first mold core comprising a first molding face, the first mold core further comprising four side faces extending from the first mold base to the first molding face and perpendicular to the first molding face and the first mold base, the four side face being respectively a first side face, a second side face, a third side face, and a fourth side face;
    a second mold half opposite to the first molding face of the first mold half; and
    a first thermoelectric generator comprising:
        a first high temperature conductive portion defining a receiving space having a shape substantially identical to that of the first mold core, the first high temperature conductive portion being configured to enclose and contact the four side faces of the first mold core and to collect heat emitted from the first mold half when the first mold core mates with the receiving space;
        a first low temperature conductive portion exposed to the air; and
        a first semiconductor electricity-generating portion positioned between the high temperature conductive portion and the low temperature conductive portion and configured to convert the heat collected by the high temperature conductive portion into electricity, the semiconductor electricity-generating portion comprising a plurality of P-type semiconductors and a plurality of N-type semiconductors, wherein the P-type semiconductors and the N-type semiconductors are alternately arranged and connected in series with one another;
    a second thermoelectric generator positioned in contact with the second mold half, wherein the second mold half comprises a second mold base and a second mold core connected to the second mold base, the second mold core comprises a second molding face corresponding to and facing the first molding face, the second mold core further comprises four side surfaces extending from the second mold base to the second molding face and perpendicular to the second molding face and the second mold base, the four side surface is respectively a first side surface, a second side surface, a third side surface, and a fourth side surface, the second thermoelectric generator comprises a second high temperature conductive portion, a second semiconductor electricity-generating portion, and a second low temperature conductive portion exposed to the air; the second high temperature conductive portion defines a receiving space having a shape substantially identical to that of the second mold core, the first high temperature conductive portion is configured to enclose and contact the four side surfaces of the second mold core and configured to conduct the heat emitted from the second mold half to the second semiconductor electricity-generating portion when the second mold core mates with the receiving space; the second semiconductor electricity-generating portion is sandwiched between the second high temperature conductive portion and the second low temperature conductive portion, and positioned in contact with the second high temperature conductive portion and the second low temperature conductive portion; the second semiconductor electricity-generating portion is configured for forming a voltage difference according to a temperature difference between the second high temperature conductive portion and the second low temperature conductive portion.

2. The mold of claim 1, wherein the first mold core comprises at least one first inlet pipe and at least one first outlet pipe, the at least one first inlet pipe is configured to guide molten plastic to flow into the first mold core, and the at least one first outlet pipe is configured to guide the molten plastic to flow out from the first mold core.

3. The mold of claim 2, wherein the first thermoelectric generator comprises at least two first openings to allow the at least one first inlet pipe and the at least one first outlet pipe to pass through.

4. The mold of claim 1, wherein the second mold core comprises at least one second inlet pipe and at least one second outlet pipe, the at least one second inlet pipe is configured to guide molten plastic to flow into the second mold core, and the at least one second outlet pipe is configured to guide the molten plastic to flow out from the second mold core.

5. The mold of claim 4, wherein the second thermoelectric generator comprises at least two second openings to allow the at least one second inlet pipe and the at least one second outlet pipe to pass through.

* * * * *